(12) United States Patent
Hutchinson et al.

(10) Patent No.: US 7,062,550 B1
(45) Date of Patent: Jun. 13, 2006

(54) SOFTWARE-IMPLEMENTED METHOD FOR IDENTIFYING NODES ON A NETWORK

(75) Inventors: Scott H. Hutchinson, Missouri City, TX (US); Gregory M. Hanka, Houston, TX (US)

(73) Assignee: BindView Corporation, Houston, TX (US)

( * ) Notice: Subject to any disclaimer, the term of this patent is extended or adjusted under 35 U.S.C. 154(b) by 1403 days.

(21) Appl. No.: 09/233,860

(22) Filed: Jan. 20, 1999

(51) Int. Cl.
 *G06F 15/177* (2006.01)
 *G06F 15/173* (2006.01)

(52) U.S. Cl. ............... 709/224; 709/223; 709/221; 709/222

(58) Field of Classification Search .......... 709/218, 709/221, 228, 222, 223, 224; 370/401, 351
See application file for complete search history.

(56) References Cited

U.S. PATENT DOCUMENTS

| | | | | |
|---|---|---|---|---|
| 5,444,850 A | * | 8/1995 | Chang ................. | 709/222 |
| 5,490,139 A | * | 2/1996 | Baker et al. ........... | 370/401 |
| 5,535,338 A | * | 7/1996 | Krause et al. .......... | 709/222 |
| 5,542,092 A | | 7/1996 | Chow ................. | 375/500 |
| 5,572,528 A | * | 11/1996 | Shuen ................ | 370/402 |
| 5,590,285 A | * | 12/1996 | Krause et al. .......... | 709/218 |
| 5,608,720 A | * | 3/1997 | Biegel et al. ........... | 370/249 |
| 5,757,924 A | * | 5/1998 | Friedman et al. ........ | 380/49 |
| 5,774,640 A | * | 6/1998 | Kurio ................ | 714/4 |
| 5,819,042 A | * | 10/1998 | Hansen ............... | 709/222 |
| 5,835,725 A | * | 11/1998 | Chiang et al. .......... | 709/500 |
| 5,841,991 A | * | 11/1998 | Russell ............... | 709/221 |
| 5,878,420 A | * | 3/1999 | Salle ................. | 707/10 |
| 5,894,479 A | * | 4/1999 | Mohammed ........... | 370/401 |
| 5,923,850 A | * | 7/1999 | Barroux .............. | 709/224 |
| 5,958,018 A | * | 9/1999 | Eng et al. ............. | 709/246 |
| 5,970,066 A | * | 10/1999 | Lowry et al. .......... | 370/353 |
| 5,982,753 A | * | 11/1999 | Pendleton et al. ....... | 370/252 |

FOREIGN PATENT DOCUMENTS

| | | |
|---|---|---|
| EP | 0 556 012 A2 | 2/1993 |
| EP | 0621 705 A2 * | 2/1994 |
| EP | 0 865 180 A2 | 3/1998 |
| JP | 07107100 | 4/1993 |

OTHER PUBLICATIONS

European Search Report Publication No. 0 556 012 A3, Application No. 93300919.3, Filed Sept. 2, 1993, Applicant Matsushita Electric Industrial Co., Ltd., pp. 1–2.

IBM Technical Disclosure Bulletin, vol. 36, No. 1, Jan. 1993, pp. 70–72.

* cited by examiner

*Primary Examiner*—Paul L. Rodriguez
(74) *Attorney, Agent, or Firm*—Hugh R. Kress; Browning Bushman P.C.

(57) ABSTRACT

A method and apparatus for a node on a network to transmit identifying information about itself, typically in the course of an audit of the hardware and/or software that are present on the network. The method involves the node transmitting both a current node identifier value and a former node identifier value, each typically a network interface card (NIC) address. The former node identifier value permits the receiver of the transmission to determine which node is involved even if the current node identifier has been changed since the previous audit (e.g., because of a change of NICs). The current and former node identifier values may be stored in a timestamped hidden file, e.g., an .INI-type file. Such file may be redundantly stored on multiple partitions, with the timestamp used to determine which is the most recently updated file.

20 Claims, 5 Drawing Sheets

SOFTWARE-IMPLEMENTED METHOD FOR IDENTIFYING NODES ON A NETWORK

1. BACKGROUND OF THE INVENTION

1.1. Field of the Invention

The invention was made in attempting to solve a specific problem in connection with "auditing" nodes, e.g., computer workstations and other computers (referred to sometimes here as microcomputers) on a computer network. The problem being addressed by the inventors was that of uniquely identifying nodes on a network for the purpose of maintaining a central database reflecting the hardware and software configurations of the respective nodes.

1.2. Description of Related Art

Recent years have witnessed the development of a category of software application products which enable a network system administrator ("SYSADMIN") to track computers and similar equipment ("nodes"), and their components, on computer networks. Applications in this category are sometimes referred to as "asset management" products. Typically, asset management products assess the hardware and software components associated with a node on a network and maintain a central database of those nodes and components. The central database is usually remote (on a central computer) from the particular nodes being audited, inventoried or tracked; it is typically used by the SYSADMIN in managing network equipment and software.

An illustrative network on which such an asset management product might be used is shown in FIG. 1. The network 100 includes two nodes 101, sometimes referred to as "client nodes," and a node 102, sometimes referred to as a "server node," connected by communications links 103.

The client nodes 101 and server node 102 are typically (but not necessarily) programmable computers. The two depicted client nodes 101 and the server node 102 are merely representative examples; a typical network may include many such nodes.

The network 100 may be wide or local in geographical scope, i.e., either a local area network ("LAN") or a ("WAN"). Thus, the client nodes 101 and server node 102 may be geographically close, e.g., in the same building, or geographically dispersed, e.g., in separate cities.

The network may employ any one of a variety of topologies, protocols, and machine architectures as are known in the art. For example, the network 100 may embody a bus, star, or ring topology, may employ an Ethernet or token-ring protocol, or any other type of network, and may employ a peer-to-peer or client-server architecture.

The communications links 103 may be optical fibers, electrical cables, telephone wires, and/or wireless links depending on the particular embodiment implemented.

The foregoing examples are mentioned simply for purposes of illustration; those of ordinary skill having the benefit of this disclosure will realize that the network 100 may take many other possible conventional forms.

The various client nodes 101 typically will either be programmable computers (e.g., a user workstation) or will include one or more programmable processors (e.g., a printer server). As such, each client node 101 will normally include writeable storage 104, which may take the form of some or all of, e.g., a floppy disk drive, a hard disk drive, removable storage media (e.g., a ZIP™ drive, JAZ™ drive, a writeable CD-ROM drive, etc.), a tape drive, a flash-memory storage device, or any other suitable storage medium now known or later developed.

Like the client node 101, the server node 102 contains a storage 105, e.g., a disk drive.

Each client node 101 and the server node 102 contains a network interface card (NIC) 107.

1.3. The Desirability of Unique Node Identification

One task of an asset management product is to identify nodes uniquely and to recognize both when nodes 101 have been identified before and when they have not been, so as to recognize the node 101 each time the asset management product 'sees' it in the future, e.g., when the asset management product "audits" the node. This is required in order to match every node 101 up with its records in the central database. This allows the asset management product to know if there have been any changes in the components of a node 101 (e.g., a floppy drive has been removed) since a previous audit.

2. SUMMARY OF THE INVENTION

The invention relates to an asset-management software product, which in one embodiment comprises a server program executing at a server node 102 and a client program executing at a client node 101.

In a first aspect of the invention, at the beginning of each audit, one or more unique attribute values (described in more detail below) of a client node 101 are detected by the client program. These attribute values are transmitted to the server program, which uses them to correlate the client node with a specific record in a central database (creating a new record if necessary). The one or more unique attribute values are also stored to a local database at the client node 101. Upon the next audit, the client program reads information from the local database to find out what the unique attribute values had been during the previous audit and transmits those values as well as the "new" detected values (which may now be different from the previous values). This transmission of out of date information as well as "new" information allows the server program to correctly correlate the client node with its (by now out of date) records in the central database if one or more of these unique attribute values of the node is changed.

In a second aspect of the invention, one specific attribute value tracked by the asset management product is the current address of the network interface card 107 ("NIC address") for each node 101 and any former NIC address it may have had in the past (i.e., its NIC address prior to obtaining the current one) for the purpose of node identification.

In a third aspect of the invention, one or more client nodes 101, referred to as "lonely nodes," either (1) has no active NIC 107 or (2) is configured so that the NIC address is undetectable by the client program. In the central database, the NIC address for each client node 101 is recorded for use during node identification; for lonely nodes, a fake NIC address is generated and stored. The fake NIC address is created in such a way that it is highly unlikely ever to duplicate any real NIC address in the network in question.

In a fourth aspect of the invention, the local database stored at a client node 101 is duplicated on multiple active partitions of its local hard-disk drive or drives 104, preferably on each such partition. Every copy of the local database receives a timestamp reflecting the time it was last updated, so that subsequent audits of the client node 101 can determine which copy (of possibly many) is the freshest.

3. BRIEF DESCRIPTION OF THE DRAWINGS

Other aspects and advantages of the invention will become apparent upon reading the following detailed description and upon reference to the drawings in which.

4. DETAILED DESCRIPTION OF SPECIFIC EMBODIMENTS

4.1 Overview of the Problem

Essential as it is, unique identification in a network 100 is problematic for at least two reasons. First, computers in a typical network 100 are, from the point of view of a software application, fundamentally alike, with only small differences setting them apart from each other. Second, those small differences are subject to change over the course of time and maintenance. There does not yet exist a standard, ubiquitous 'fingerprint' for computers/nodes 101 yet, so asset management products must approximate one using whatever shifting data they can find on each node.

4.1.1 The OEM Motherboard Serial Number as Potential Node Identifier

Figure 1:
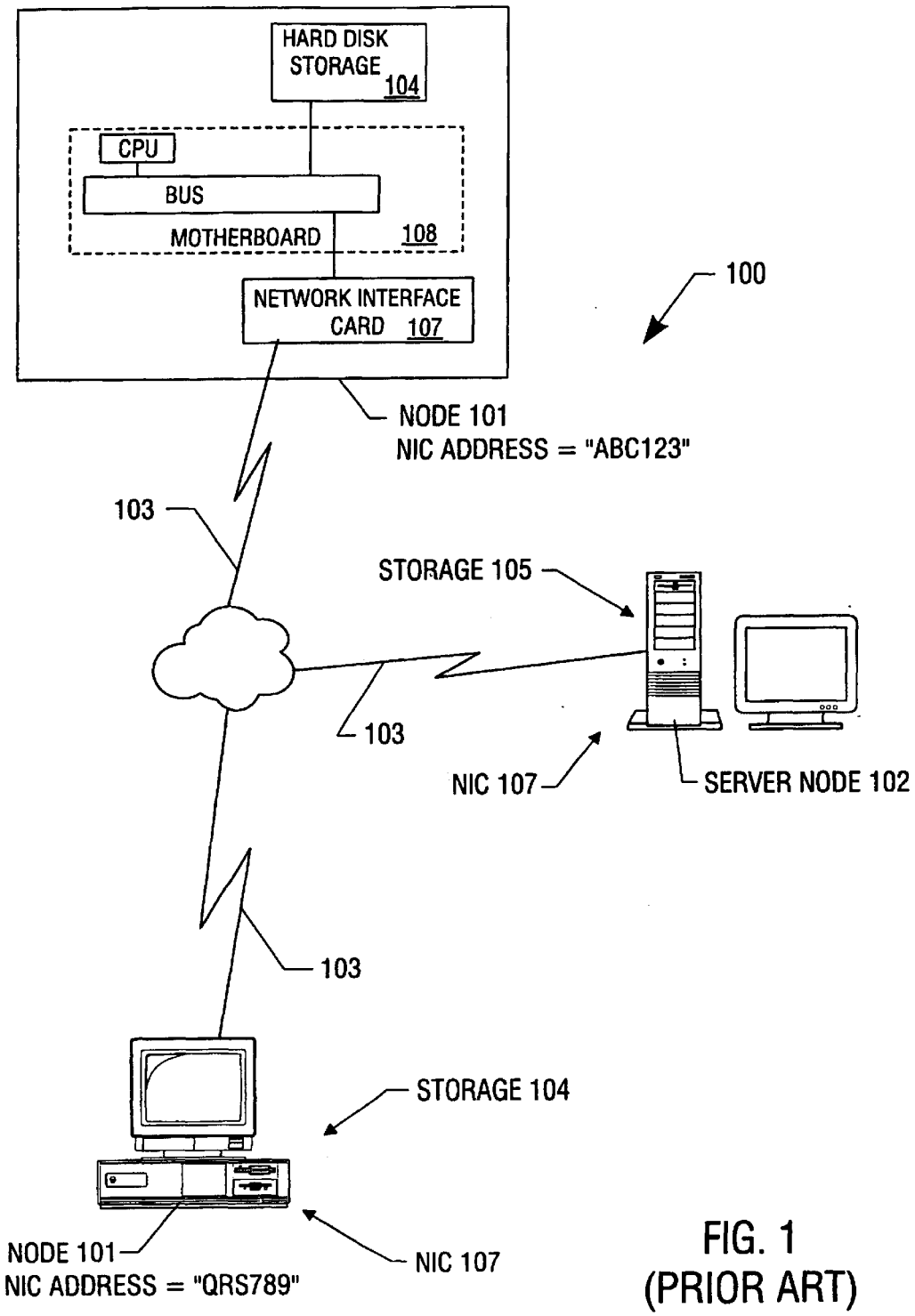
FIG. 1 is a block diagram of a hypothetical prior-art network.

Referring to FIG. 1, at this writing, the closest thing to a fingerprint for microcomputers, and thus for a client node 101, is the new, fledgling standard for motherboard serial numbers. A motherboard 108 is the comparatively large and complex circuit-board on which most of a microcomputer's electronics are mounted. Of the many components that make up a complete microcomputer, the motherboard 108 is the one best designated the "central component," in the sense that system administrators expect to be able to change any other component of a microcomputer (such as a hard-drive) and still have their asset management product recognize that it is the same node as before (only now with a new hard-drive). In the current psychology of the art, the motherboard 108 "is" the microcomputer, all else is merely its interface to the world. So, node identification would best track the motherboard 108, via some kind of unique serial-number built into it by its manufacturer.

Unfortunately, as noted above, the standard for motherboard serial-numbers is a fledgling standard. The standard is referred to as "Desktop Management Interface" or "DMI." New computers do not necessarily support DMI completely, or support it at all, to say nothing of the world of older computers built before DMI was finalized. So, motherboard serial numbers are not likely for many years to suffice as a universal node identification medium for an asset management product.

4.1.2 The NIC Address as Potential Node Identifier

Again referring to FIG. 1, another unique node component for conventional microcomputer-based nodes is the network interface card 107 ("NIC"). As is well known to those of ordinary skill, the term "network interface card" is a generic term for hardware circuitry (usually with appropriate "firmware" programming) that provides an interface between, e.g., a microcomputer and a network. A network interface card 107 might take the form of a circuit board that is inserted into an open slot inside a desktop computer or in a docking station for a notebook computer; or a credit card-sized PCMCIA card (also known as a PC Card) that can be inserted into a slot in a notebook computer; or circuitry built directly into the motherboard of either a desktop or notebook computer, i.e., not as a separate component at all.

Each NIC is assigned a unique built-in identifier by its manufacturer, known as the media access control ("MAC") address, referred to hereafter as the "NIC address." The NIC address is roughly analogous to the vehicle identification number ("VIN") assigned to cars and trucks by their manufacturers. Generally speaking, in this context an "address" is a sequence of letters, numbers, etc., that serves as an identifier.

Referring to FIG. 1, suppose that the server node 102 sends out data specifying that the data is intended for the client node 101 having a NIC 107 whose NIC address is e.g., "ABC123." Normally, the data will be broadcast on the network 100. All client nodes 101 will "hear" the data, including the client node 101 having a NIC 107 whose NIC address is "QRS789," but only the specific client node 101 whose address is "ABC123" will actually respond to the data.

The current framework within which NIC addresses are created is administered by a committee of the Institute of Electrical and Electronics Engineers ("IEEE"). The committee assigns blocks of addresses to each NIC manufacturer. Each manufacturer then permanently or semi-permanently installs specific addresses from its respective address block(s) into one or more semiconductor chips on the NICs 107 by a process sometimes known as "burning" the address.

Ideally, the use of NIC addresses in this manner ensures that every NIC 107 in the world has a unique address. (In this specification, the term "unique" is used in a local sense, i.e., unique to a given network. NIC manufacturers sometimes reuse NIC addresses, but the odds are slim that two identically-addressed NICs 107 would ever show up in the same network.) Thus, since every computer on a conventional network has a NIC 107, an asset management product could use the NIC address as its universal node identification, and therefore each computer having a NIC 107 would have a unique address dress on the network.

Figure 2:
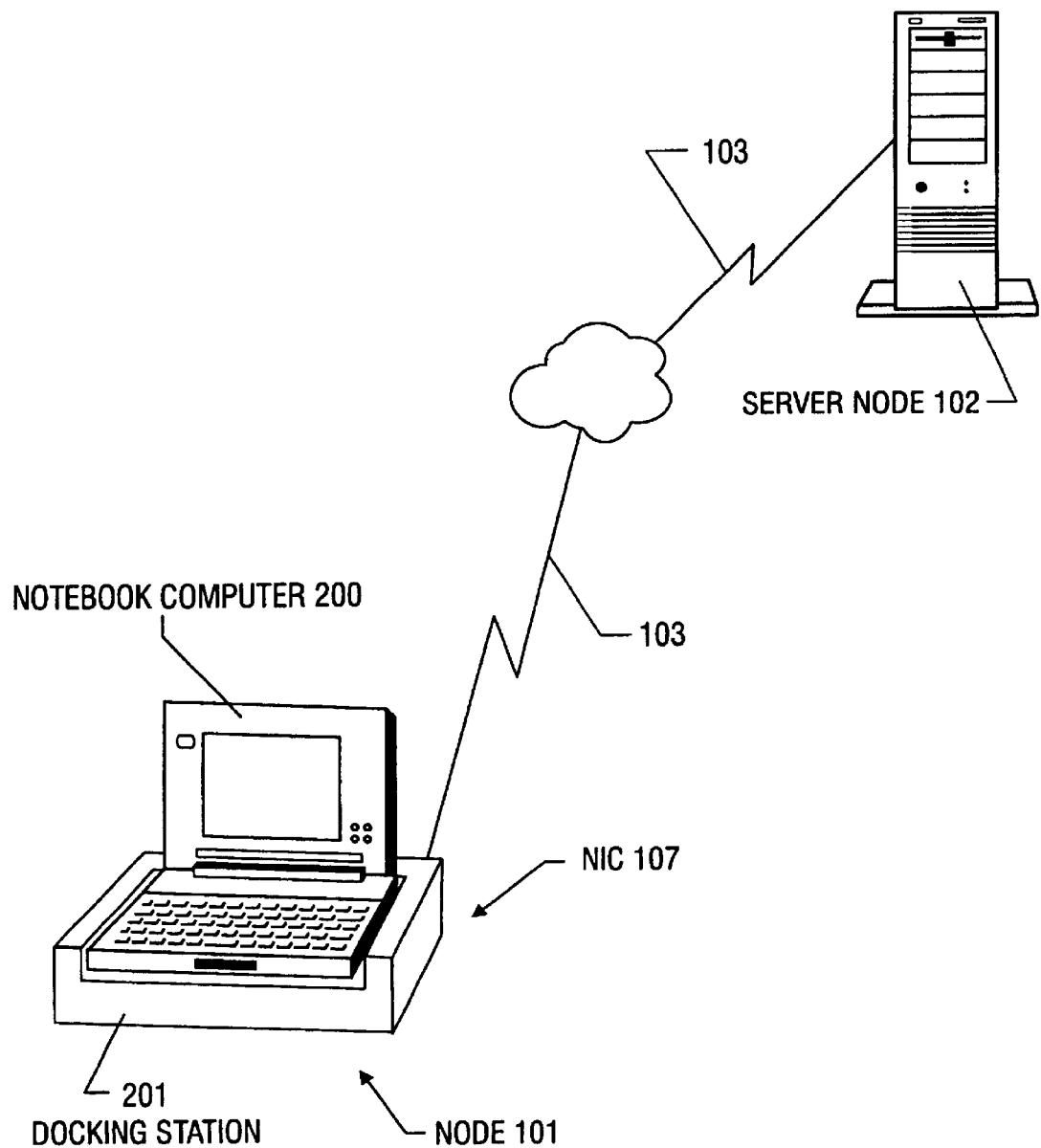
FIG. 2 is a block diagram of a possible variation on such a network.

The NIC 107, however, is often not a permanent part of a microcomputer's motherboard 108; very often it is a removable component plugged into the motherboard. Changing a node's NIC 107 is sometimes required, if for example if the NIC becomes defective, or if the network topology changes so as to require a different type of NIC, or if the node itself is moved (e.g., if a notebook computer is moved from docking station to docking station, as shown in FIG. 2, where each docking station contains its own separate NIC). With a new NIC 107 presumably comes a new NIC address, and thus any asset management product relying solely on the NIC address for node identification will falter when a node's NIC 107 changes in this way. (By analogy, the FBI would have a similar problem if a person's fingerprints were to change every time the person got a manicure.)

4.1.3 The Hard Drive Contents as Potential Node Identifier

Still another potentially unique component in a microcomputer is its fixed disk drive ("hard disk" or "hard drive"), or more precisely, the contents thereof, shown as hard disk storage 104 in FIG. 1. During the first inspection or audit of a node, an asset management program can write its tracking data to a hidden file on a node's hard drive 104. During subsequent inspections, the asset management program can retrieve the hidden file and thus recognize the node as the one inspected earlier.

The potential downfalls of the hard-drive-contents approach are many, however. For example:

1. Hard drives 104 are sometimes "reformatted," in which their entire contents are erased to begin anew; in the process, any hidden files previously placed there by an asset management program are normally lost.

2. Hard drives 104 are sometimes moved from one microcomputer (i.e., one client node 101) to another, which can thoroughly confuse any asset management product that presumes every hard drive 104 to be "married" to its motherboard 108.

3. It is not unusual for the contents of one hard drive 104 to be transferred in their entirety to the hard drive 104 of another microcomputer, i.e., another client node 101; at that point, two client nodes 101 have identical copies of the hidden file placed on the first microcomputer/node by the asset management product, which will now incorrectly treat both microcomputers/nodes 101 as the same node.

4. Nodes 101 with multiple operating systems installed will often have several different file systems on their respective hard drives 104; thus, an asset management product would "see" a different hard drive 104, in the sense of seeing a different file system, each time the microcomputer/node 101 boots under a different operating system, causing the asset management product to mistakenly regard each as a separate node.

There are other components of microcomputers that could be used as identifiers for nodes 101, but unlike the three listed above, none of them are universally available under all operating systems, or are available from all hardware manufacturers, or are acceptably likely to be unique within a given network.

4.1.4 Summary of Selected Difficulties With Various Node-Identifier Approaches

Some of the difficulties with various methods of identifying client nodes, including prior-art approaches as well as aspects of the approaches disclosed and claimed in this specification, are summarized in Table 1 below (in which X represents a failure case and a forward slash/represents a nonfailure case):

tional vendor IDs from IEEE. In any given installation (network), it is safe to assume that all NIC addresses are unique.

OEM serial number—this is the serial number burned into the motherboard 108 of the workstation/node 101 by its manufacturer. With some difficulty, it can sometimes be changed by a system administrator.

C: serial number—this is the four-byte serial number assigned to a formatted partition on a hard drive 104. It is recreated when the partition is reformatted, but otherwise does not change.

Drive 0 boot-record ID—this is a (for all intents and purposes) random number created in the boot record of the "primary" hard drive 104 on the node's hard disk controller, as indicated in the BIOS (basic input-output software) of the node 101. In many computers, the drive 0 boot-record ID is created by an FDISK utility program at the time that the "partitions" for the hard drive 104 are set up.

Drive 0 firmware serial—this is a serial number permanently burned into the actual hard drive unit 104, and in most cases, it is a very long, very unique string of characters assigned by the hard drive's manufacturer. Unfortunately, a few manufacturers do not bother to use unique serial numbers.

Hidden file on boot drive—this is the practice of leaving a hidden file, e.g., an .INI-type file, on the boot drive 104 of the workstation/node 101, containing node identification information.

Hidden file on all drives—this is the practice of leaving a hidden file, e.g., an .INI-type file, on every available hard drive 104 on the workstation/node 101 in accordance with the invention, as discussed below.

FAILURE CASES: The failure cases listed in the top row of Table 1 are the following:

Reformat C:—the primary hard drive partition of the workstation/node 101 was reformatted, destroying the 'C: serial number' and also any hidden files (e.g., .INI-type files) contained thereon.

FDISK drive 0— a stronger version of 'Reformat C:' in which the workstation's primary hard drive 104 was repar-

TABLE 1

Summary of Some Difficulties with Node-Identifier Approaches

← FAILURE CASES →

| NODE ID METHOD ↓ | Reformat C: | FDISK drive 0 | New NIC | NIC swap | Multi-boot | New HDD | HDD swap | Diskless workstation | Cookie-cutter machine | GHOST ™ machine |
|---|---|---|---|---|---|---|---|---|---|---|
| NIC Address | / | / | X | X | / | / | / | / | / | / |
| OEM serial No. | / | / | / | / | / | / | / | / | / | / |
| C: serial No. | X | X | / | / | X | X | X | X | X | X |
| Drive 0 boot record ID | / | X | / | / | / | X | X | X | / | X |
| Drive 0 firm-ware serial | / | / | / | / | / | X | X | X | / | / |
| Hidden file on boot drive | X | X | / | / | X | X | X | X | / | / |
| Hidden file on all drives | X | X | / | / | / | X | X | X | / | / |

NODE-IDENTIFICATION METHODS: The node-identification methods listed in the far-left column of Table 1 are as follows:

NIC address—as noted above, this is the "MAC address" burned into the firmware of the network interface card 107. It consists of six bytes, three for a vendor code assigned by IEEE and three for a serial number for use by that vendor. Vendors endeavor to avoid duplicating MAC addresses in their production NICs, sometimes even requesting addititioned and reformatted. Not only does this destroy the 'C: serial number' and any hidden files, e.g., .INI-type files, it can also reset the 'Drive 0 boot-record ID'.

New NIC—the workstation received a new network interface card 107, which gives it a new NIC address.

NIC swap—the workstation/node 101 traded network interface cards 107 with another workstation. Afterward, each workstation/node 101 has the other's former NIC address.

Multi-boot—the workstation/node 101 uses boot-manager software (like System Commander™) to boot different operating systems. The various operating systems may designate different partitions as being the "C: drive," and even more commonly, may regard different partitions as their boot drive. A further complication is that certain partitions may be invisible or inaccessible on a particular operating system; for example, a Windows NT™ NTFS™ partition cannot be accessed by DOS, Windows 95™, Windows 98, Windows 2000, OS/2™.

New HDD—the workstation/node 101 received an entirely new hard drive unit 104. This condition is equivalent to 'FDISK drive 0', with the added complication that the 'Drive 0 firmware serial' also changes.

HDD swap—the workstation traded hard drives with another workstation. Afterward, each workstation has the other's former 'C: serial number', 'Drive 0 partition ID', 'Drive 0 firmware serial', and all hidden files, e.g., .INI-type files.

Diskless workstation—the workstation has no local hard drives, and hence, no 'C: serial number', no 'Drive 0 partition ID', no 'Drive 0 firmware serial', and no possibility of any hidden files, e.g., INI-type files.

Cookie-cutter machines—the workstation was created from a prerecorded image of a hard-drive, including an entire operating system and support software. As a result, it has the same 'C: serial number' as all of its siblings.

GHOST™ machines—the workstation/node 101 was created using a PC imaging program such as GHOST™, DiskImage, Disklone, or other automatic software installation programs, which very thoroughly transplant the contents of one workstation's hard drive 104 to the hard drive 104 of another workstation/node 101. As a result, the new workstation/node 101 has the same "C: serial number" and the same "Drive 0 boot-record ID" as all of its "siblings" created in this way.

4.1.5 Inferences from Analysis

From the information in Table 1, the following may be inferred:

"OEM serial number," i.e., a unique identification number of the motherboard 108, is the only 100% reliable node-ID method. Unfortunately, OEM serial-number detection is not yet widely available, and is far from an industry standard.

"NIC address" is an excellent alternative node-ID method, if only movements of NICs 107 could be handled somehow.

If "NIC address" could somehow be combined with "hidden file [e.g., .INI-type file] on all drives", the result would be 100% reliable for any single failure condition. (The case of multiple coincident failures is likely to be too complex to handle with anything other than the "OEM serial" approach.)

4.2. Illustrative Software-Based Solution

The multi-faceted approach of the invention is explained with reference to the network 100 shown in FIG. 1.

4.2.1 Client Program; Server Software

The software running in each client node 101 includes an "agent" program referred to sometimes as an "audit" program and referred to here as a client program. The client program may be designed to run as a conventional foreground program, or as a background application, in whatever form is appropriate for the operating system in question (e.g., a terminate-and-stay-resident [TSR] program under MS-DOS or PC DOS, or a background service under other operating systems). Some well-known operating systems at this writing include, e.g., Windows 3.1; Windows 95; Windows 98; Windows NT; Windows 2000; Mac OS; various flavors of UNIX; and the like.

The client program exchanges information, via the communications links 103, with a server program that is likewise running on the server node 102. The server program performs many of the functions described below.

(In this specification, phrases such as "the client program doing X," where X is some function or functions, will be understood by those of ordinary skill as referring to one or more programmable processors performing the specified function(s) under control of the software in question.)

The client program can also run on the server node 102, so that the server program can keep track of the hardware comprising the server node 102 itself. In that sense, the server node 102 is also a client node 101.

4.2.2 Node-Identification Record at Client Node

Figure 3:
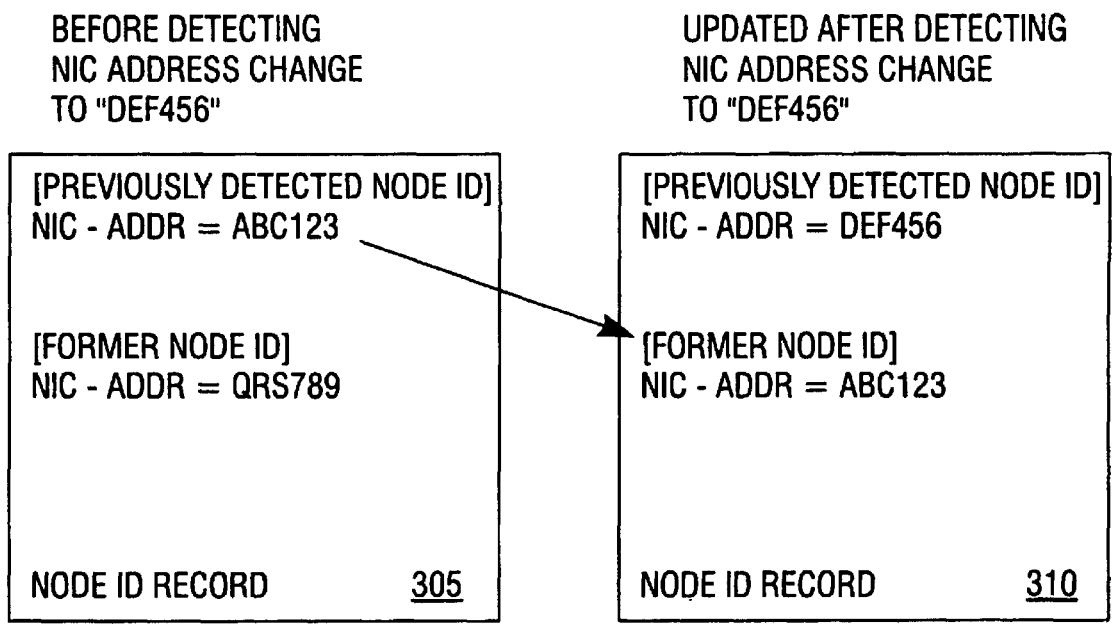
FIG. 3 is a before-and-after block diagram of a node identification record in accordance with one implementation of the invention.

Referring to FIG. 3, the client program running on each client node 101 maintains a node-identification record 305 in a local database at the storage 104 of the node. The node-identification record 305 may be stored in a separate file, e.g., an .INI-type file, in the storage 104, or it may be added to an existing file, in either case as text information as illustrated in the hypothetical example shown in FIG. 3. (Still another alternative is to store the node-identification record 305 in the Windows registry.) The file preferably has appropriate attributes set in the usual manner so that the file is "hidden" from users. It will be apparent that the selection of an .INI-type file in FIG. 3 is for convenience only and that other types of local data storage (again preferably hidden) may be used.

In one specific embodiment, each node-identification record 305 is stored in its own .INI-type file having a unique fully-qualified file path (i.e., the complete "name" of the file) and a timestamp indicating the date and time at which the file was last modified (both the "name" and the timestamp are conventionally provided by the operating system). The local database thus consists of whatever .INI-type files of that kind have been created in this manner.

The node-identification record 305 preferably includes, possibly among other information, the value of one or more node-identification attributes of the node, i.e., attributes of the hardware and/or software configuration of the node that tend to be unique within a given network. For example, the node-identification record 305 may include (i) a "previously-detected" NIC address, i.e., the NIC address detected by the client program during the immediately-preceding audit (sometimes referred to in the appendixes as the current NIC address stored in an .INI file), or, if no such address was detected, a "fake" NIC address as described below; and (ii) a "former" NIC address, i.e., the most recent NIC address detected by the client program that is different from the "previously-detected" NIC address. The previously-detected NIC address is used for back-up purposes in case no NIC is detected by the client program. It will be appreciated that any number of former NIC addresses may be stored in the node-identification record 305 if desired, thus creating a history for that particular client node 101.

The node-identification record 305 may be initialized by the client program when that software runs on the client node 101 for the first time. It may be updated either on a scheduled basis or in response to specific events (e.g., every time the client program is "booted up," i.e., started, or every time the client program performs an audit of the client node 101).

4.2.3 Central Database at Server Node

A central database (not specifically shown in the drawing figures) is stored in the storage 105 at the server node 102. Generally speaking, the database is a compilation or some all of the information stored in the node-identification records 305 at the respective client nodes 101, typically with one data record in the database per client node 101. The database may also store other audit-related information provided by a client node 101, again typically in one record per node. The database is conventionally initialized and periodically updated, either on a regular scheduled basis or in response to specific events.

4.3 Basic Node Identification Method

A node's NIC address represents a reliable client node 101 identification method. The caveat, however, is that network interface card movements must be tracked somehow. The node-identification records 305 and the central database provide tools that can be used in such auditing.

4.3.1 Initial Audit

During an initial audit of a client node 101, the client program running on that client node conventionally detects the node's NIC address. The just-detected NIC address is then stored in a new node-identification record 305 (e.g., a new, timestamped .INI-type file) at the client node's data storage 104 as described in Section 4.2.2 above. If a NIC address is not successfully detected, then a "fake" NIC address is used and stored instead, as discussed in more detail in Section 4.5 below. The value of the just-detected NIC address (or of the "fake" NIC address) is written to the node-identification record 305 both as the "previously-detected" NIC address and as the "former" NIC address.

4.3.2 Transmission of Initial Audit Information

The client program then transmits, to the server program via the network 100, the desired node-identification information for that client node 101, including two specific items: The just-detected NIC address (or alternatively the "fake" NIC address), plus the "former" NIC address from the new node-identification record 305. (Since this is the first time the node has been audited, the "former" NIC address field will be empty; it may be transmitted as a prearranged empty-field value, e.g., all zeros, or alternatively it may be transmitted as a signal indicating the absence of a former NIC address.) The transmitted node-identification information may also include, e.g., the OEM motherboard serial number as discussed in Section 4.1, to the extent available.

When received by the server program, the fingerprint information is stored in the database (e.g., by the server program itself or by a separate database management system [DBMS] routine in response to a call from the server program).

4.3.3 Subsequent Audits

Figure 4:
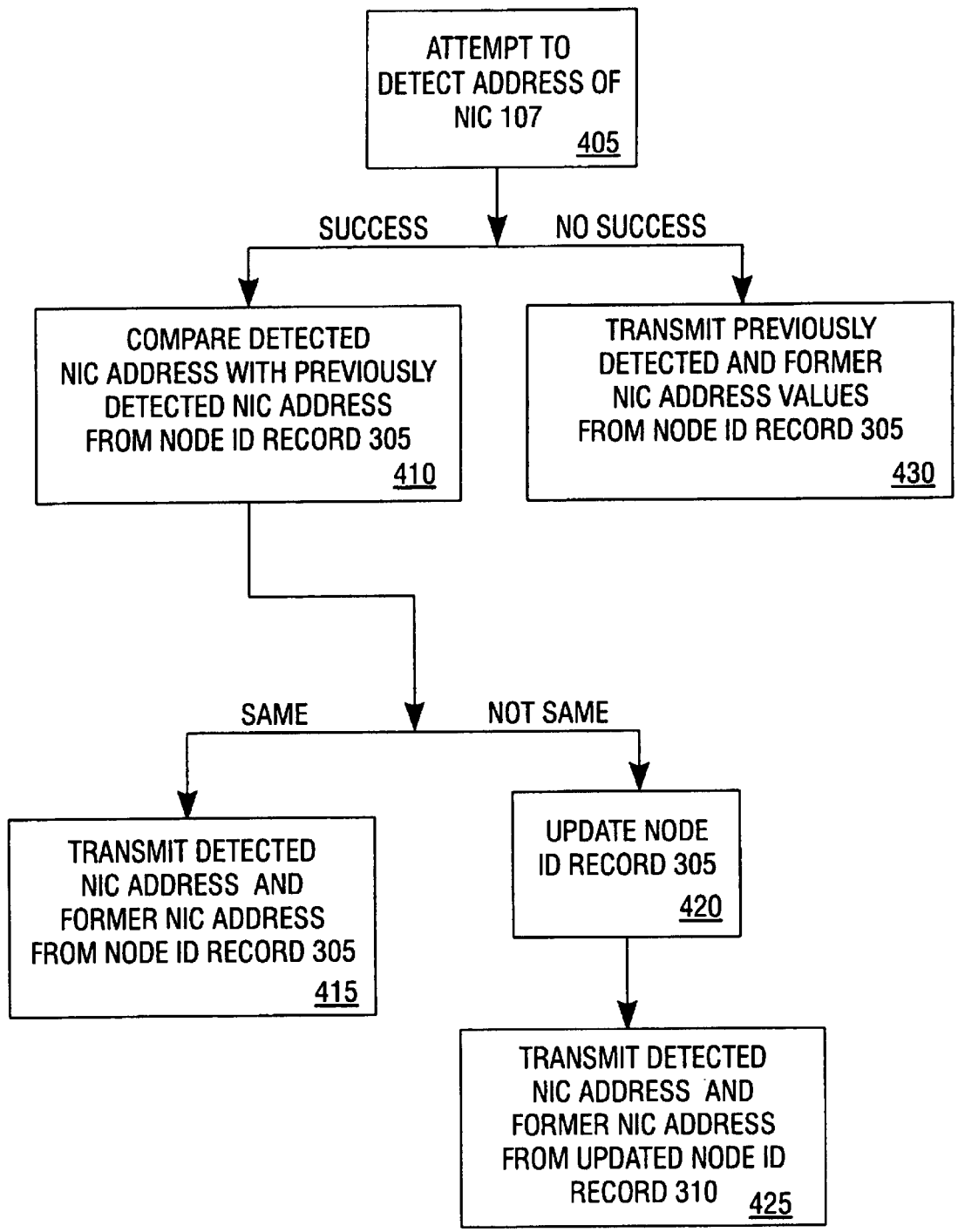
FIG. 4 is a flow chart illustrating some operations performed in accordance with first and second aspects of the invention described above.

Referring to FIG. 4: During subsequent audits of the same client node 101, the client program again attempts to detect a NIC address (block 405). In addition, the client program reads the most recent node-identification record 305, e.g., the .INI-type file with the most recent timestamp.

If a NIC address is successfully detected, the address is compared to the contents of the node-identification record 305 (block 410). If the node-identification record 305 contains a previously-detected node address that is identical to the just-detected node address, then the client program knows that the NIC 107 has not changed since the last audit, and therefore the node-identification record 305 is current and may be transmitted with the former NIC address (block 415). However, if the "previously-detected" NIC address in the node-identification record is different from the just-detected NIC address, then the client program knows that the NIC 107 has changed since the last audit. The client program therefore moves the "previously-detected" NIC address in the node-identification record to the "former" NIC address field, and then copies the just-detected NIC address into the "previously-detected" NIC address field in an updated version of the node-identification record, identified with reference numeral 310 (block 420); the detected NIC address and the newly-updated former NIC address are then transmitted (block 425).

If, on the other hand, no NIC address was successfully detected, the client program uses the "previously detected" NIC address from the node-identification record 305 as the "just detected" NIC address, assuming that the NIC has not changed since it was last detected (block 430). If no "previously detected" NIC address is available in any node-identification record 305, the client program generates a fake NIC address instead as described in more detail in Section 4.5.

Once again the client program transmits desired node-identification information to the server program as described in Section 4.3.2 above. The server program uses this information to locate the node's record in the central database. The server program seeks the record according to the just-detected NIC address (which may in fact be "fake" or "previously detected") and the "former" NIC address. If no record is found matching the two, the server program seeks the record according to the "former" NIC address, on suspicion that the node's NIC address has recently changed and is therefore still recorded in the central database under its "former" NIC address.

In the hypothetical case shown in FIGS. 3 and 4, the client node's NIC address has just changed from "ABC123" to "DEF789." The server program will look up the node as "DEF789 formerly ABC123," which will fail, so the server will then re-try looking up the node, this time as "ABC123", which will succeed since ABC123 was indeed the node's NIC address during its last audit.

The central database is then conventionally updated to reflect the most recently detected NIC address (be it real or fake, the server program does not care)—in effect, now identifying the client node 101 as "the client node DEF789 formerly ABC123".

A pseudocode appendix setting forth the server-program algorithm in detail is reproduced as Appendix 1 below.

4.4 Replicated Node-Identification Records

It was noted above that a local database is maintained at the data store 104 of each client node 101. The local database contains a description of some of that client node's unique attribute values that may be used for identification.

Figure 5:
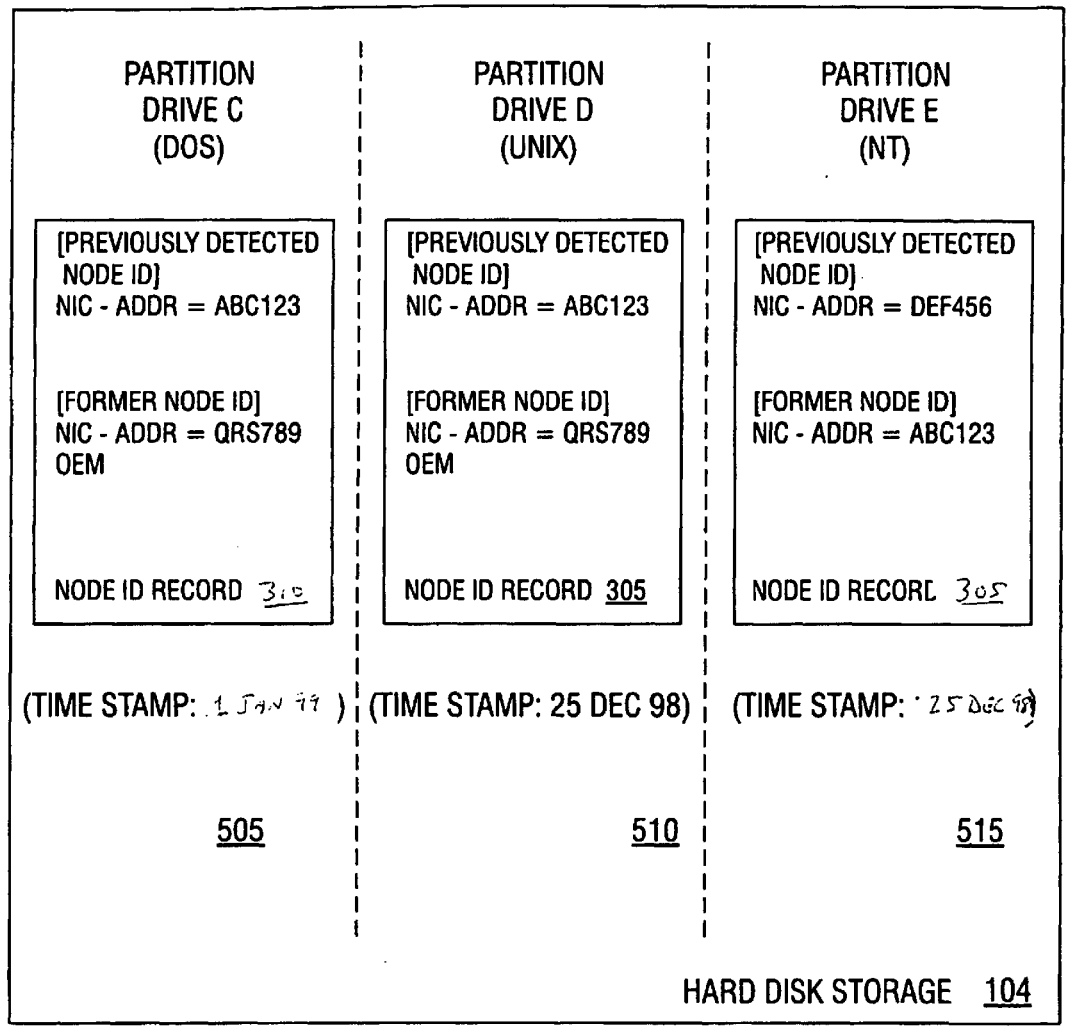
FIG. 5 shows a hypothetical three-way partitioning of a hard disk drive and redundant storage of a node identification record on each partition in accordance with the invention.

Referring to FIG. 5 as a hypothetical example: In one aspect of the invention, when the data store 104 includes one or more hard disks or similar partitionable storage media, a mirrored copy of the local database is maintained on each active partition 505, 510, 515, etc., of each such hard disk. At the beginning of an audit, the client program checks the respective internal timestamps of all accessible copies of the local database 505, 510, 515, etc., to determine which copy is most recent. The most recent copy is utilized during the audit as described above. Afterward, the updated local database is rewritten onto the accessible partitions 505, 510, 515, etc., of all hard drives 104, overwriting any old copies. Included in the rewrite is an update of the timestamps of the copies.

The aforementioned functionality permits the asset management product to deal with nodes that "boot" with multiple operating systems. Sometimes, a computer will have several operating systems installed, and will boot between them at-will. Local hard-disk partitions 505, 510, 515, etc., that are visible under one operating system are sometimes invisible under other operating systems. So, an audit under one operating system may generate six copies of the local database, but then a subsequent audit under another operating system may update only three of them. The next audit under the original operating system will show three old copies and three new copies. Thanks to the timestamps, the client program can tell which copy or copies contain the latest information about the node's unique attribute values. This information is used by the central database for node identification.

In the hypothetical example shown in FIG. 5, the storage 104 at the client node 101 is configured with a hard disk drive that is divided into separate partitions 505, 510, 515, etc., that may be logically configured as drives C, D, and E respectively, with different, selectively-bootable operating systems on each partition. In the illustration of FIG. 5, the three logical drives are shown as being bootable into MS-DOS, UNIX, and Windows NT respectively.

Such a partitioning can cause complications for the audit process. Suppose that the client node 101 is "booted up" (i.e., started) into, say, MS-DOS on drive C, but the node-identification record 305 is stored only on drive D containing, say, the UNIX operating system. It will be quickly recognized by those of ordinary skill having the benefit of this disclosure that, because of certain limitations in MS-DOS, any files stored on drives D and E—which could include the node-identification record 305—may be inaccessible to client program running under MS-DOS unless the CONFIG.SYS file for MS-DOS is properly configured. (It will be apparent that client program appropriate for the operating system actually booted must be provided on an accessible logical drive.)

In such a configuration, the node-identification record 305 may be replicated, i.e., redundantly stored within each of the logical drives C, D, and E, thus making its contents available to client program no matter which operating system is booted. Consequently, if the client node 101 is booted into MS-DOS from drive C, and drives D and E are inaccessible, the copy of the node-identification record 305 can still be updated by client program running under MS-DOS; the updated copy is identified by reference numeral 310.

As noted above, however, that in turn presents another issue: If only the copy 310 of the node-identification record on drive C is updated (because by hypothesis drives D and E are inaccessible), then the replicated copies of the node-identification record 305 on drives D and E may be out of date the next time that UNIX or Windows NT is booted. This issue may be addressed by having the client program, upon its own booting, check the timestamps in any accessible copies of the node-identification record 305 and 310 and use only the latest one as described above.

(As used in this specification, including in the claims, the term "redundantly stored" is not intended to be limited to the situation in which all instances, i.e., all copies of the node-identification record, have been synchronized. That is, the term "redundant storage" is intended to include, not exclude, the situation in which one copy of the record has been updated but the other copies have not yet been updated, as shown in FIG. 3.)

4.5 Tracking of "Lonely" Nodes

It is not always possible to detect a network interface card 107 on certain client nodes 101, thus precluding the use of a NIC address as the exclusive node identifier for that client node 101. For example, when a client node 101 that is part of a Windows NT™ network 100 is booted under DOS, it is likely that the network interface card 107 will not be active if no DOS drivers for the network interface card 107 are installed. Or, referring again to FIG. 2, an undocked notebook computer 200 may have its network interface card 107 located in a docking station 201; the notebook computer 200 is considered part of the network 100, but it does not have an active network interface card 107 because it is undocked. Other client nodes 101 in the network might not have a network interface card 107 at all, but they are still "in the network" 100, so to speak, from the perspective of the system administrator, who desires to be able to keep track of them. Such client nodes 101 are referred to as "lonely nodes." Without a NIC address, these nodes do not have the universal 'fingerprint' required by the asset management product for the recognition purposes.

So, when initially building a node-identification record 305 for a "lonely" client node 101 (i.e., one without an active network interface card 107), the client program generates, and stores in the node-identification record 305, a "fake" NIC address to correspond only to that particular lonely node. The generated NIC address is fake in the sense that it is unique to the network 100.

The fake NIC address is used by the client program and the server program in the same general way as a real NIC address, unless and until a real NIC address is subsequently detected on the node in question. If a real NIC address is subsequently detected on the node, then the fake NIC address is retired as the node's "former NIC address."

Fake NIC addresses must not duplicate any possible real NIC address, lest a fake NIC address accidentally duplicate the address of a real NIC on the network and thus confuse the two nodes in the central database. Non-duplication is accomplished by using a block of NIC addresses allocated to the applicant by IEEE. The asset management product can create fake NIC addresses anywhere within this block under IEEE's guarantee that no NIC manufacturer can be assigning NIC addresses in the same range.

In one implementation, the fake NIC address is generated by combining a known signature portion (e.g., a three byte signature code or NIC vendor ID assigned to the software vendor by the IEEE) with a pseudorandomly generated portion, for a total of six bytes of data. A typical fake NIC address looks like this: 00-90-D4-1F-E3-22. The first three bytes of the fake NIC address consist of a NIC vendor ID assigned by the IEEE. The last three bytes are generated pseudorandomly by the asset management product. An example of an algorithm for generating pseudorandom portions is shown in Appendix 3.

The signature portion of the fake NIC address is included so that the server software running on the server 102 will recognize that the NIC address was artificially generated. This provides the system administrator with greater node inventory reliability because the asset management product knows not to report the NIC address as a genuine one. The pseudorandom portion is added to the fake NIC address 24 in case the network 100 has more than one lonely client node 101.

It will be appreciated by those skilled in the art that a conventional pseudorandom-number generator can be used to generate the pseudorandom portion of the fake NIC address. The use of a pseudorandom-number generator provides a reasonable assurance that the fake NIC address will be unique within the network 100. One algorithm for generating fake NIC addresses is set out in Appendix 3 below. Because each byte has 256 possible values, this algorithm yields 256×256×256=16,777,216 different possible fake NIC addresses, which means the chance of getting duplicate fake NIC addresses is acceptably small.

An additional advantage provided by the use of fake NIC addresses is that it permits other existing asset management applications software to continue operating normally without the system administrator having to worry about whether a client node 101 actually has a NIC address.

Upon subsequent audits of the network 100, assuming that the lonely node is eventually connected to the network via a network interface card 107, the lonely node's actual NIC address will eventually be detected and the respective records will be updated in the node-identification record 305 at the client node itself and in a record at the database at the server node 102. As noted above in this Section, the fake NIC address is then retired as the node's now-former NIC address.

4.6 Some Alternative Implementations

In hindsight, it will be appreciated by those of ordinary skill having the benefit of this disclosure that the node identification technique disclosed here can be used in a variety of situations.

For example, the node identification technique can be used any time information is to be transmitted from a client node 101 to one or more other nodes, whether or not in response to a query by the other node(s). For example, in hindsight it will be apparent that the client node 101 may be programmed automatically to send reports of various kinds to another node running appropriate server software, without waiting for an audit command or other query from the other node.

As another example, the basic approach in which the client program sends out both current and former identification information to a server program may be used in contexts not involving a NIC address, e.g., over the Internet.

As still another example, the client program may be designed to perform some of the functions of the server program, thus possibly freeing up the server program and its host computer from operations that can be performed at the client program. This permits the asset management product to operate on a standalone basis to that extent, with the relevant portions of the database 204 being maintained (or replicated) at the local storage 104.

4.7 Program Storage Device

It will be apparent to those of ordinary skill having the benefit of this disclosure that the client program and the server software may be implemented by programming one or more suitable general-purpose computers having appropriate hardware. The programming may be accomplished through the use of one or more program storage devices readable by the computer and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

5. ORDER OF OPERATIONS IN METHOD CLAIMS

Some of the claims below recite the performance of certain operations or functions. It will be understood, by those of ordinary skill having the benefit of this disclosure, that the operations or functions in question are not necessarily required to be performed in the specific order in which they are listed in the claims.

6. SOFTWARE PSEUDOCODE APPENDIXES

The appendixes below are pseudocode listings for a specific implementation of the invention by the assignee in client program and server software.

APPENDIX 1

General Server Program Node-Identification Algorithm

```
if (local database contained a previous NIC address)
    {
    if (central DB has node with same current and previous NIC addresses)
        {
        //
        // Central database already aware of the NIC change
        //
        Audit as existing node.
        }
    else if (central DB has node with same previous NIC address and same bios date)
        {
        //
        // NIC change or NIC swap since last audit; follow local database
        //
        Audit as existing node.
        Update central database with new NIC address.
        }
    else if (central DB has a node with same current address and same bios date)
        {
        //
        // HDD swap, local database is from another node; follow current NIC instead
        //
        Audit as existing node.
        }
    else
        {
        Insert as new node.
        }
    }
else
```

APPENDIX 1-continued

General Server Program Node-Identification Algorithm

```
    {
    //
    // No local database found on the node
    //
    if (central DB has a node with same current NIC address and same bios date)
        {
        //
        // Local database lost; follow current NIC
        //
        Audit as existing node.
        }
    else
        {
        //
        // Node has not been audited before
        //
        Insert as new node.
        }
    }
```

Appendix 2: Start-to-Finish Audit Algorithm

```
****AGENT****
Try to detect the node's 'OEM serial number'. . .
    * Compaq BIOS call
    * DMI call
Search for INI file(s) written during previous audit.
if (any INI files found)
    {
    Retrieve 'former NIC address' as it was during the previous audit.
    Note: INI files are timestamped so that we know which one is newer.
    }
Try to detect 'current NIC address' . . .
    *IPX via Winsock
    *direct IPX call
    * NetBIOS call
    * VINES call
    * request GUID from Windows
    * search Windows registry
    * ask local Novell server
if (no 'current NIC address' detected or found from previous audit)
    {
    if (one or more local fixed disks are available to hold INI files)
        {
        Generate a random 'current NIC address' for use until the real NIC address is detected.
        }
    }
Create a "audit start request" message, containing (among other things):
    * current NIC address (or the temporary address if none)
    * former NIC address (from INI file, if any)
    * OEM serial number (if any)
Send the "audit start request' message to the server.
****SERVER****
Try to detect the node's NIC address from inside the server, by examining the node's NetWare connection.
if(success)
    {
    Discard the agent-detected 'current NIC address' in favor of that detected in the server.
    }
Identify the node. . .
    {
    if (auditing a NetWare file server)
        {
        if (database has a file-server node with the same name)
        {   // A server-node is identified strictly by its node-name, as opposed to the
            // by its OEM serial no. or /NIC-address. This is because where file-servers
            // are concerned, the name *is* a unique identifier.
        }
        }
else
    {
    //
    // Auditing a regular workstation
```

| Appendix 2: Start-to-Finish Audit Algorithm |
| --- |

```
    //
    if (OEM serial number at least five characters long was detected)
        {
        if (OEM serial found in database)
            {
            Audit as existing node.
            }
        }
    else if (NIC address available)
        {
        if (hidden files contained a previous node address)
            {
            if (database has a node with same current and previous address)
                {
                //
                // Servers are already aware of the NIC change
                //
                Audit as existing node.
                }
            else if (database has a node with same previous address and same bios date)
                {
                //
                // NIC change or NIC swap since last audit; follow hidden files
                //
                Audit as existing node.
                Update node address.
                }
            else if (database has a node with same current address and same bios date)
                {
                //
                // HDD swap; follow current NIC
                //
                Audit as existing node.
                }
            else
                {
                Insert as new node.
                }
            }
        else
            {
            //
            // No hidden files found
            //
                if (database has a node with same current address and same bios date)
                    {
                    //
                    // HDD reformat and ini files lost; follow NIC
                    //
                    Audit as existing node.
                    }
                else
                    {
                    //
                    // Node has not been audited before
                    //
                    Insert as new node.
                    }
            }
        }
        else
            {
            //
            // No NIC, no local fixed drives; must be a lonely audit
            // Here, the console must inject a node address into the rawfile
            // before uploading it, unless the rawfile
            // is to be identified by node-name only (a risky venture)
            //
            }
    }
Send an "audit start reply" message back to the agent.
    * The message includes the node's server-detected NIC address, if any.
****AGENT****
Receive the "audit start reply" message from server.
if ("audit start reply" message contains a 'current NIC address' as detected by the server)
    {
```

-continued

Appendix 2: Start-to-Finish Audit Algorithm

```
        Discard any agent-determined 'current NIC address'
        in favor of the server-determined 'current NIC address'.
    }
if (one or more local fixed disks are available to hold INI files)
{
    if (any INI files found)
    {
        if (INI file 'current NIC address' is different from the new 'current NIC address')
        {
            Retire INI file 'current NIC address' slot to the 'former NIC address' slot.
            Record 'current NIC address' to the INI file 'current NIC address' slot.
            Refresh INI file(s) with the current date and time.
        }
        else
        {
            The NIC address(es) recorded in the INI file(s) are still accurate.
            Refresh INI file(s) with the current date and time.
        }
    }
else
    {
        Record 'current NIC address' to new INI file(s) for use during future audits.
    }
}
```

APPENDIX 3

Fake NIC Address Generation Algorithm

```
void GenerateFakeNICAddress(U8 address[6])
{
//
// Create a random NIC address for temporary use by a node that
// cannot currently detect its own NIC address
//
// First three digits are our NIC address block, also known as
// the ethernet vendor code.
// 00-90-D4 is NETinventory's official address block as
// assigned by IEEE on 06/24/1998.
//
address[0] = 0x00;
address[1] = 0x90;
address[2] = 0xD4;
//
// seed random number generator
//
srand((unsigned int)(time(NULL)));
//
// last three bytes of NIC address are random digits
//
address[3] = (U8)(rand( ) % 256);
address[4] = (U8)(rand( ) % 256);
address[5] = (U8)(rand( ) % 256);
}
```

What is claimed is:

1. A method, executed by a node on a network, said node comprising at least one asset, of transmitting asset-management information about the node, the method comprising:
  (a) determining a current address value of a network interface card of the node, referred to as a NIC address value;
  (b) retrieving, from a data storage at the node, a former NIC address value for the node; and
  (c) transmitting asset-management information concerning the node together with the current NIC address value and the former NIC address value.

2. The method of claim 1, wherein determining the current NIC address value includes an attempt to detect the then-current NIC address value.

3. The method of claim 2, wherein the attempt to detect the then-current NIC address value is unsuccessful, and further comprising (i) retrieving, from a data storage at the node, a stored value containing the result of a past live detection of the then-current NIC address value, referred to as a previously-detected NIC address value; and (ii) transmitting the previously-detected NIC address value.

4. The method of claim 1, wherein the NIC address value comprises a signature portion and a pseudorandomly generated portion.

5. The method of claim 1, wherein the former NIC address value is redundantly stored in multiple partitions within the data storage at the node.

6. The method of claim 5, wherein (x) each copy of the former NIC address value is associated with a timestamp, and (y) retrieving the former NIC address value comprises retrieving the respective copy associated with the most recent timestamp.

7. A method, executed by a server node on a network, for recording, in a database, asset-management information about a client node, comprising:
  (a) receiving, from the client node, (1) asset-management information about the client node, (2) a current address value of a network interface card of the client node, referred to as a current NIC address value, and (3) a former NIC address value for the client node that is equal to the current NIC address value;
  (b) unsuccessfully attempting to locate, in the database, a record corresponding to the current NIC address value;
  (c) unsuccessfully attempting to locate, in the database, a record corresponding to the former NIC address value; and
  (d) storing the asset-management information, the current NIC address value, and the former NIC address value in a record in the database associated with the current NIC address value.

8. The method of claim 7, wherein the NIC address value comprises a signature portion and a pseudorandomly generated portion.

9. In a node on a network, a data store comprising a machine-readable data structure accessible to a processor in the node and containing node-identification information for the client node that includes (i) a current network interface card value for the node, referred to as a NIC address value, and (ii) a former NIC address value.

10. The data store of claim 9, wherein the NIC address value that constitutes the current node-identifier value includes a signature portion and a pseudorandomly generated portion.

11. The data store of claim 9, wherein the NIC address value comprises a signature portion and a pseudorandomly generated portion.

12. In a node on a network, a data store comprising:
   (a) a plurality of machine-readable data structures accessible to a processor in the node;
   (b) each said data structure containing node-identification information for the client node that includes (i) a current node-identifier value, and (ii) a former node-identifier value, each said value comprising a network interface card address value, referred to as a NIC address value;
   (c) each said data structure being associated with a timestamp.

13. In a server node on a network, that includes a client node, a machine-readable data structure accessible to a processor in the server node, comprising (i) a current value of network interface card address for the client node, referred to as a current NIC address value for the client node, (ii) a former NIC address value for the client node, and (iii) asset-management information about the client node.

14. The machine-readable data structure of claim 13, wherein the current NIC address value comprises a signature portion and a pseudorandomly generated portion.

15. A method, executed by a node on a network, of transmitting asset-management information about the node, the method comprising:
   (a) determining a current node identifier value, where (1) the node identifier value for any particular node in the network is dependent on one or more node-identification attributes of that node including an address value of a network interface card in the node, referred to as a NIC address value, and (2) determining the current node identifier value includes an attempt to detect the then-current values of said one or more node-identification attributes;
   (b) retrieving, from a data storage at the node, a former node identifier value for the node; and
   (c) transmitting asset-management information about the node together with the current node identifier value and the former node identifier value.

16. The method of claim 10, wherein the attempt to detect said one or more node-identification attributes fails to detect at least one of said node-identification attributes, and further comprising (i) retrieving, from a data storage at the node, a stored value containing the result of a past live detection of the said one or more node-identification attributes, referred to as a previously-detected node identifier value; and (ii) transmitting the previously-detected node identifier value.

17. A method, executed by a node on a network, of transmitting asset-management information about the node, the method comprising:
   (a) attempting but failing to detect a current network interface card address value for the node, referred to as a current NIC address value;
   (b) retrieving, from a data storage at the node, a previously-detected NIC address value;
   (c) retrieving, from a data storage at the node, a stored value of a former NIC address value for the node; and
   (d) transmitting the asset-management information together with the previously-detected NIC address value and the former NIC address value.

18. A method, executed by a client node and a server node on a network, for recording, in a database, asset-management information about the client node, comprising:
   (a) the client node (1) determining a current address value of a network interface card in the node, referred to as a NIC address value, (2) retrieving, from a data storage at the node, a former NIC address value for the node, and (3) transmitting to the server node the asset-management information, the current NIC address value, and the former NIC address value;
   (b) the server node (1) unsuccessfully attempting to locate, in the database, a record corresponding to the current NIC address value, (2) locating, in the database, a record corresponding to the former NIC address value, (3) recording the asset-management information in said record, and (4) updating the record to correspond to the current NIC address instead of to the former NIC address value.

19. A program storage device readable by a processor in the client node of a specified one of claims 1 through 3, 4, through 6, and 15 through 18, and encoding a program of instructions including instructions for performing the operations recited in the specified claim as being performed by the client node.

20. A program storage device readable by a processor in the server node of a specified one of claims 7, 8, and 18 and encoding a program of instructions including instructions of performing the operations recited in said specified claim as being performed by the client node.

* * * * *

UNITED STATES PATENT AND TRADEMARK OFFICE
CERTIFICATE OF CORRECTION

PATENT NO. : 7,062,550 B1  Page 1 of 1
APPLICATION NO. : 09/233860
DATED : June 13, 2006
INVENTOR(S) : Scott H. Hutchinson and Kaitlyn Denise Hanka It is certified that error appears in the above-identified patent and that said Letters Patent is hereby corrected as shown below:

Title Page;
On the cover of the patent at (75), the inventor name "Gregory M. Hanka", is corrected to
-- Kaitlyn Denise Hanka --.

Signed and Sealed this
Seventh Day of June, 2011

David J. Kappos
*Director of the United States Patent and Trademark Office*